Patented Aug. 11, 1931

1,818,083

UNITED STATES PATENT OFFICE

PAUL NAWIASKY, OF LUDWIGSHAFEN-ON-THE-RHINE, OTTO BRAUNSDORF, OF HOCHST-ON-THE-MAIN, AND ALFRED EHRHARDT, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

CONDENSATION PRODUCTS OF THE BENZANTHRONE SERIES

No Drawing. Application filed December 3, 1928, Serial No. 323,559, and in Germany December 29, 1927.

The present invention relates to the production of condensation products of the benzanthrone series by treating oxidation products of Bzl-benzanthronyl-thioglycollic acid or derivatives thereof with alkaline condensing agents.

We have found that valuable condensation products of the benzanthrone series are obtained by treating oxidation products of Bzl-benzanthronyl-thioglycollic acids in which the 2-position is unoccupied which are probably sulfoxids corresponding to the formula:

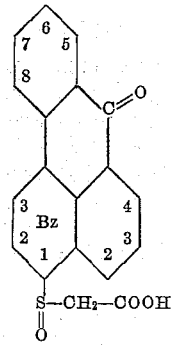

or derivatives or substitution products thereof, with alkaline condensing agents. The products are readily precipitated from this aqueous alkaline solution even by weak acids.

By a treatment with mild oxidizing agents, the said products undergo further condensation into blue-green substances possessing the character of vat dyestuffs. This condensation can be effected, for example by the introduction of air into the warmed alkaline solution, or by the addition of other oxidizing agents, such as ammonium persulfate or potassium ferricyanid to the alkaline solution. The oxidation may, however, also be effected by heating the dried intermediate products with nitrobenzene or with inert solvents, as for example trichlorbenzene, o-dichlorbenzene, napthalene and the like in the presence of air, or by warming their solution in highly concentrated sulfuric acid for a short time, whereby, however, sulfonation easily takes place. The progress of the reaction for the formation of these alkali-soluble condensation products and their resulting condensation products which give blue green dyeings from the vat may probably be represented somewhat as follows:

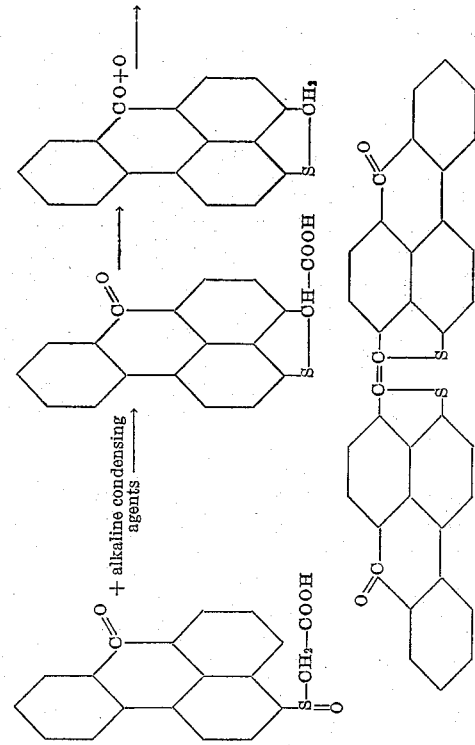

Derivatives of the oxidation products of Bzl-benzanthronyl-thioglycollic acid or substitution products thereof in which the carboxlyic group is replaced by such other groups as are capable of being converted into the carboxylic group by saponification, for instance the esters, amides, nitriles and similar derivatives, may also be employed as initial material, in which case the condensation is preferably carried out in the absence of water. By condensation of the last mentioned initial material products are obtained which are analogous to those above described, the main difference as regards their properties being that they are, generally speaking, substantially more stable towards mild oxidizing agents, under the action of which they are only gradually and incompletely converted into the said blue-green condensation products with the properties of vat dyestuffs. With aqueous alcoholic alkalies the said condensation products form, for the most part, red colored solutions with strong fluorescense. After exposure to the action of safonifying agents, they behave in precisely the same manner as the condensation products of the free acids herein described, inasmuch as, like those, they are converted by weak oxidizing agents, into condensation products possessing the character of vat dyestuffs.

The following examples will further illustrate the nature of the said invention which however is not limited thereto. The parts are by weight.

Example 1

Into a mixture of 50 parts of potassium hydroxid and 50 parts of ethyl alcohol heated to from 90° to 100° centigrade, 10 parts of the oxidation product of Bzl-benzanthronyl-thioglycollic acid of a melting point of 208° centigrade (which can be obtained, for example, by oxidizing Bzl-benzanthronyl-thioglycollic acid with about the amount, calculated for the production of a sulfoxid, of ammonium persulfate or with concentrated nitric acid or with hydrogen peroxid in a solution of concentrated sulfuric acid, or by treating an aqueous solution of an alkali metal salt of the Bzl-benzanthronyl-thioglycollic acid with a solution of sodium hypochlorite at room temperature and which possesses the character of a Bzl-benzanthronyl-sulfoxid acetic acid) which acid is preferably employed in the form of an alkali metal salt, are introduced, whereupon the melt is kept at 90° centigrade for about 2 hours. After cooling, the brownish-red reaction mass is diluted with water and acidified, a brown product being precipitated thereby, which, after filtration, dissolves in concentrated sulfuric acid to a greenish-blue solution with a red fluorescence. The dry product can be converted into the bluish-green condensation product having the properties of a vat dyestuff by boiling it in nitrobenzene or in trichlorbenzene in contact with the air. The solution acquires a green color, and the condensation product gradually separates out, for the most part in the form of lustrous dark blue needles. It is cooled down to 110° centigrade, filtered, thoroughly washed with warm nitrobenzene and benzene, and dried.

The conversion of the intermediate product into the colored final product may also be effected by warming the alkaline solution to 70° centigrade and passing air through it at that temperature until no further precipitation occurs. The crude dyestuff is filtered off, dried and purified, as for example by extraction with boiling inert organic solvents, such as nitrobenzene. The intermediate product may also be dissolved in 90 per cent sulfuric acid, and the solution be maintained at from 95° to 100° centigrade for 30 minutes. The final product separates out on dilution with water. The purification can also in this case be effected by boiling with inert solvents.

On precipitation from a solution in concentrated sulfuric acid, in which it dissolves sparingly with a brownish-violet color, the colored condensation product forms a blue-green paste, which gives blue dyeings on cotton from a blue vat. On exposure to the air the color changes into an extremely fast blue-green.

Example 2

10 parts of the oxidation product of Bzl-benzanthronyl-thioglycollic acid referred to in the foregoing example are introduced at about 90° to 100° centigrade into a mixture of 100 parts of potassium hydroxid and 40 parts of water, which melt is kept at this temperature for about 5 hours, whereupon it is worked up as described in the foregoing example.

Example 3

Into a mixture of 200 parts of anhydrous pyridine and 40 parts of potassium hydroxid, heated to from 35° to 40° centigrade, 10 parts of the methyl ester of the oxidation product of Bzl-benzanthronyl-thioglycollic acid (obtainable, for example, by heating the said oxidation product with methyl alcohol and a small quantity of concentrated sulfuric acid) are introduced. The melt is then kept at from 35° to 40° centigrade, whereby it is gradually colored to a dark blue. When the melt has ceased growing darker in shade, it is diluted with water, acidified with hydrochloric acid, and the precipitate is filtered by suction and dried. The condensation product obtained constitutes a brownish-yellow mass which after recrystallization from mono-chlorbenzene dissolves in an alcoholic solution of sodium hydroxid with a bluish-red color and yellow fluorescence and in concentrated sulfuric acid to a greenish-blue solution with red fluorescence. For conversion into the bluish-green condensation product having the properties of a vat dyestuff, a suitable method is to heat 2 parts of the crude product with 15 parts of 30° Beaumé caustic soda solution and 25 parts of water, to boiling for an hour. Precipitation is then effected with dilute hydrochloric acid, and the separated product is further treated in the same manner as the first condensation product obtained in Example 1.

In a similar manner as described above, the amide or the nitrile of the oxidation product of Bzl-benzanthronyl-thioglycollic acid or their substitution products in which the 2-position is unoccupied can be employed.

What we claim is:

1. A process for the production of condensation products of the benzanthrone series which comprises treating a compound probably corresponding to the formula:

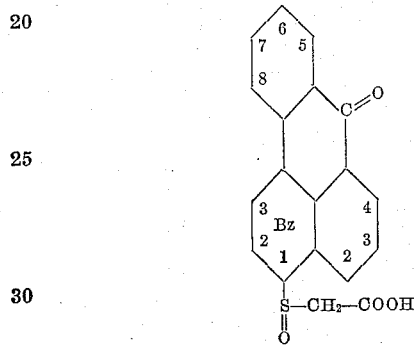

in which the 2-position must be free and the caboxylic group may be substituted by such other groups as are capable of being saponified to a carboxylic group, with an alkaline condensing agent.

2. A process for the production of vat dyestuffs of the benzanthrone series which comprises treating a compound probably corresponding to the formula:

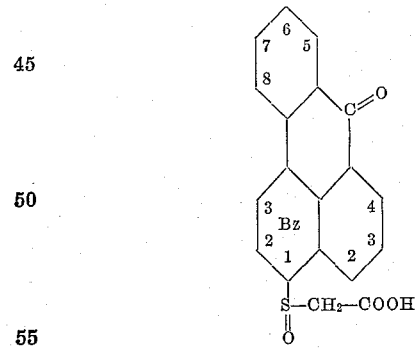

in which the 2-position must be free and the carboxylic group may be substituted by such other groups as are capable of being saponified to a carboxylic group, with an alkaline condensing agent and converting the condensation product into a vat dyestuff by means of a mild oxidizing agent.

3. A process for the production of condensation products of the benzanthrone series which comprises treating a compound probably corresponding to the formula:

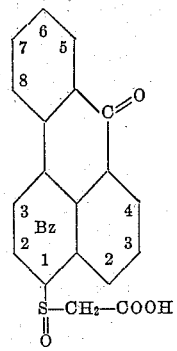

in which the 2-position must be free, with an alkaline condensing agent, diluting the reaction mass with water and precipitating the condensation product by acidifying the filtrate.

4. A process for the production of vat dyestuffs of the benzanthrone series which comprises treating a compound probably corresponding to the formula:

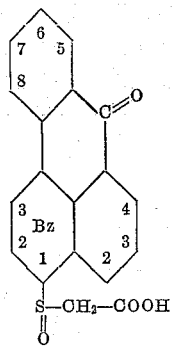

in which the 2-position must be free, with an alkaline condensing agent, diluting the reaction mass with water, precipitating the condensation product by acidifying the filtrate, and converting the condensation product into a vat dyestuff by means of a mild oxidizing agent.

5. A process for the production of vat dyestuffs of the benzanthrone series which comprises treating a compound probably corresponding to the formula:

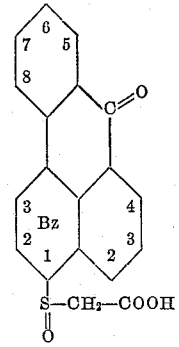

in which the 2-position must be free, with an alkaline condensing agent, diluting the reaction mass with water, precipitating the condensation product by acidifyng the filtrate and converting the condensation product into a vat dyestuff by boiling it in trichlor-benzene in contact with the air.

6. As a new article of manufacture the compound corresponding to the formula:

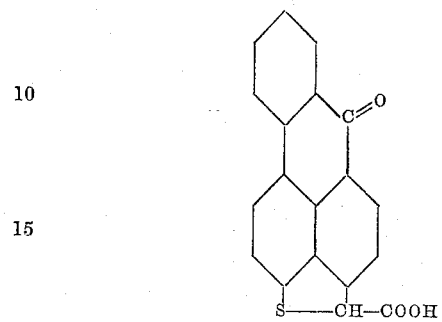

which is insoluble in dilute acids, soluble in an alcoholic caustic alkali solution with a red-brown color and greenish-yellow fluorescence and which when dissolved in concentrated sulfuric acid gives a greenish-blue solution with red fluorescence.

In testimony whereof we have hereunto set our hands.

PAUL NAWIASKY.
OTTO BRAUNSDORF.
ALFRED EHRHARDT.